(12) United States Patent
Xiong et al.

(10) Patent No.: US 11,045,945 B2
(45) Date of Patent: Jun. 29, 2021

(54) METHOD FOR CONTROLLING WALKING OF ROBOT AND ROBOT

(71) Applicant: UBTECH Robotics Corp, Shenzhen (CN)

(72) Inventors: Youjun Xiong, Shenzhen (CN); Hao Dong, Shenzhen (CN); Yuesong Wang, Shenzhen (CN); Mingguo Zhao, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 308 days.

(21) Appl. No.: 16/212,619

(22) Filed: Dec. 6, 2018

(65) Prior Publication Data
US 2019/0217464 A1 Jul. 18, 2019

(30) Foreign Application Priority Data
Jan. 17, 2018 (CN) .......................... 201810045622.4

(51) Int. Cl.
| | | |
|---|---|---|
| *B25J 9/00* | (2006.01) | |
| *B25J 9/16* | (2006.01) | |
| *B62D 57/032* | (2006.01) | |
| *B25J 13/08* | (2006.01) | |
| *B25J 19/02* | (2006.01) | |

(52) U.S. Cl.
CPC .......... *B25J 9/0006* (2013.01); *B25J 9/0009* (2013.01); *B25J 9/1633* (2013.01); *B25J 13/085* (2013.01); *B25J 13/088* (2013.01); *B25J 19/02* (2013.01); *B62D 57/032* (2013.01)

(58) Field of Classification Search
CPC ...... B25J 9/0006; B25J 9/0009; B25J 9/1633; B25J 13/085; B25J 13/088; B25J 19/02; B25J 9/1607; B25J 9/1689; B62D 57/032
USPC ........................................................ 700/245
See application file for complete search history.

(56) References Cited

U.S. PATENT DOCUMENTS

| | | | | |
|---|---|---|---|---|
| 5,151,859 A | * | 9/1992 | Yoshino | B62D 57/032 180/8.6 |
| 5,808,433 A | * | 9/1998 | Tagami | B62D 57/032 180/8.6 |
| 8,855,821 B2 | | 10/2014 | Seo et al. | |
| 2005/0126833 A1 | * | 6/2005 | Takenaka | G01C 21/16 180/8.1 |
| 2006/0197485 A1 | * | 9/2006 | Kawai | B62D 57/032 318/568.12 |

(Continued)

FOREIGN PATENT DOCUMENTS

CN 103862475 A 6/2014

*Primary Examiner* — B M M Hannan

(57) ABSTRACT

A method for controlling walking of a robot includes: determining a stance of the robot, in response to the robot being in a single-leg stance, determining a rotational angle of each of the joints, and calculating a value of a torque produced by a force of gravity acting on the robot about each of the joints; in response to the robot being in a double-leg stance, calculating a position of a projection of a center of mass of the robot on a surface where the robot stands, and calculating a value of a torque produced by a force of gravity acting on the robot about each of the joints according to the position of the projection; obtaining a feed-forward current of each of the joints; and applying the feed-forward current of each of the joints to a corresponding actuator of this joints.

19 Claims, 5 Drawing Sheets

(56) References Cited

U.S. PATENT DOCUMENTS

| | | | | |
|---|---|---|---|---|
| 2007/0084278 A1* | 4/2007 | Kawal | ............... | A61B 5/1038 |
| | | | | 73/172 |
| 2008/0312049 A1* | 12/2008 | Ido | ............... | A61H 3/00 |
| | | | | 482/66 |
| 2009/0171503 A1* | 7/2009 | Takenaka | ............... | B62D 57/032 |
| | | | | 700/250 |
| 2009/0306824 A1* | 12/2009 | Zaier | ............... | B62D 57/032 |
| | | | | 700/250 |
| 2010/0286822 A1* | 11/2010 | Zaier | ............... | B62D 57/032 |
| | | | | 700/245 |
| 2012/0165983 A1* | 6/2012 | Park | ............... | B25J 9/1664 |
| | | | | 700/258 |
| 2012/0197435 A1* | 8/2012 | Maisonnier | ............... | B25J 9/16 |
| | | | | 700/245 |
| 2012/0245734 A1* | 9/2012 | Yun | ............... | B62D 57/032 |
| | | | | 700/253 |
| 2012/0316683 A1* | 12/2012 | Seo | ............... | B62D 57/032 |
| | | | | 700/261 |
| 2012/0316684 A1* | 12/2012 | Lee | ............... | B62D 57/032 |
| | | | | 700/261 |
| 2013/0218345 A1* | 8/2013 | Lee | ............... | B25J 9/162 |
| | | | | 700/261 |
| 2013/0231822 A1* | 9/2013 | Gouaillier | ............... | B62D 57/032 |
| | | | | 701/23 |
| 2017/0183047 A1* | 6/2017 | Takagi | ............... | B62D 57/032 |
| 2018/0220935 A1* | 8/2018 | Tadano | ............... | A61B 5/112 |
| 2018/0235518 A1* | 8/2018 | Barton | ............... | A61B 5/1117 |

\* cited by examiner

METHOD FOR CONTROLLING WALKING OF ROBOT AND ROBOT

CROSS REFERENCE TO RELATED APPLICATIONS

This application claims priority to Chinese Patent Application No. 201810045622.4, filed Jan. 17, 2018, which is hereby incorporated by reference herein as if set forth in its entirety.

BACKGROUND

1. Technical Field

The present disclosure generally relates to robots, and particularly to a method of controlling walking of a robot and a robot.

2. Description of Related Art

Gait control of humanoid robots, when they are walking, has always been a hot topic in academia and industry, which has an important impact on balance abilities of robots.

Gait control, in some conventional humanoid robots, is achieved by tracking gait planning positions. One problem with such a gait control method is that impact forces generated are not considered when humanoid robots switch between a single-leg stance and a two-leg stance, and these forces tend to cause errors in tracking where the robot walks, thereby negatively affecting the balance of humanoid robots.

BRIEF DESCRIPTION OF DRAWINGS

Many aspects of present embodiments can be better understood with reference to the following drawings. Components in the drawings are not necessarily drawn to scale, the emphasis placed upon clearly illustrating principles of the present embodiments. Moreover, in the drawings, all views are schematic, and like reference numerals designate corresponding parts throughout several views.

DETAILED DESCRIPTION

Figure 1:
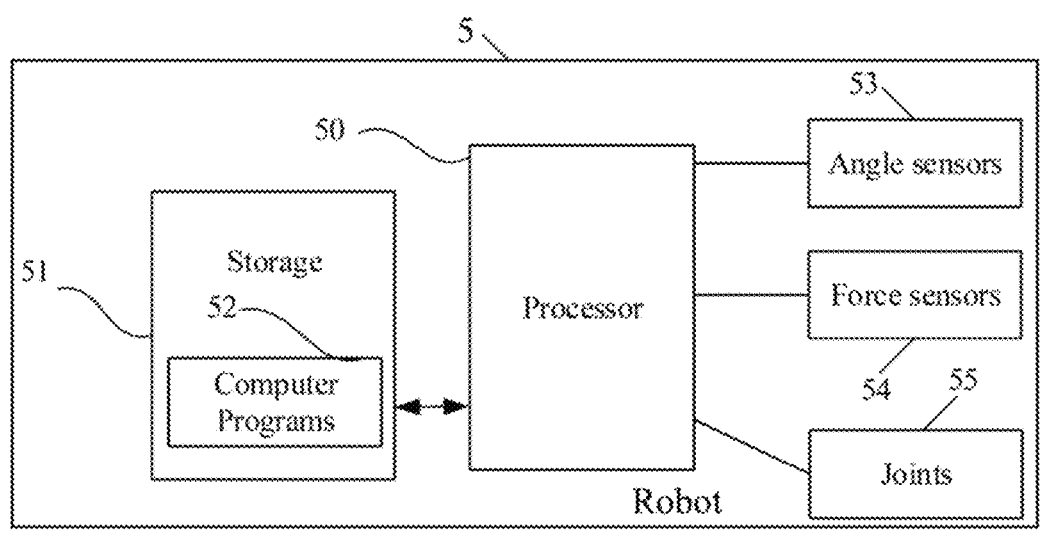
FIG. 1 is a schematic block diagram of a robot according to an embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
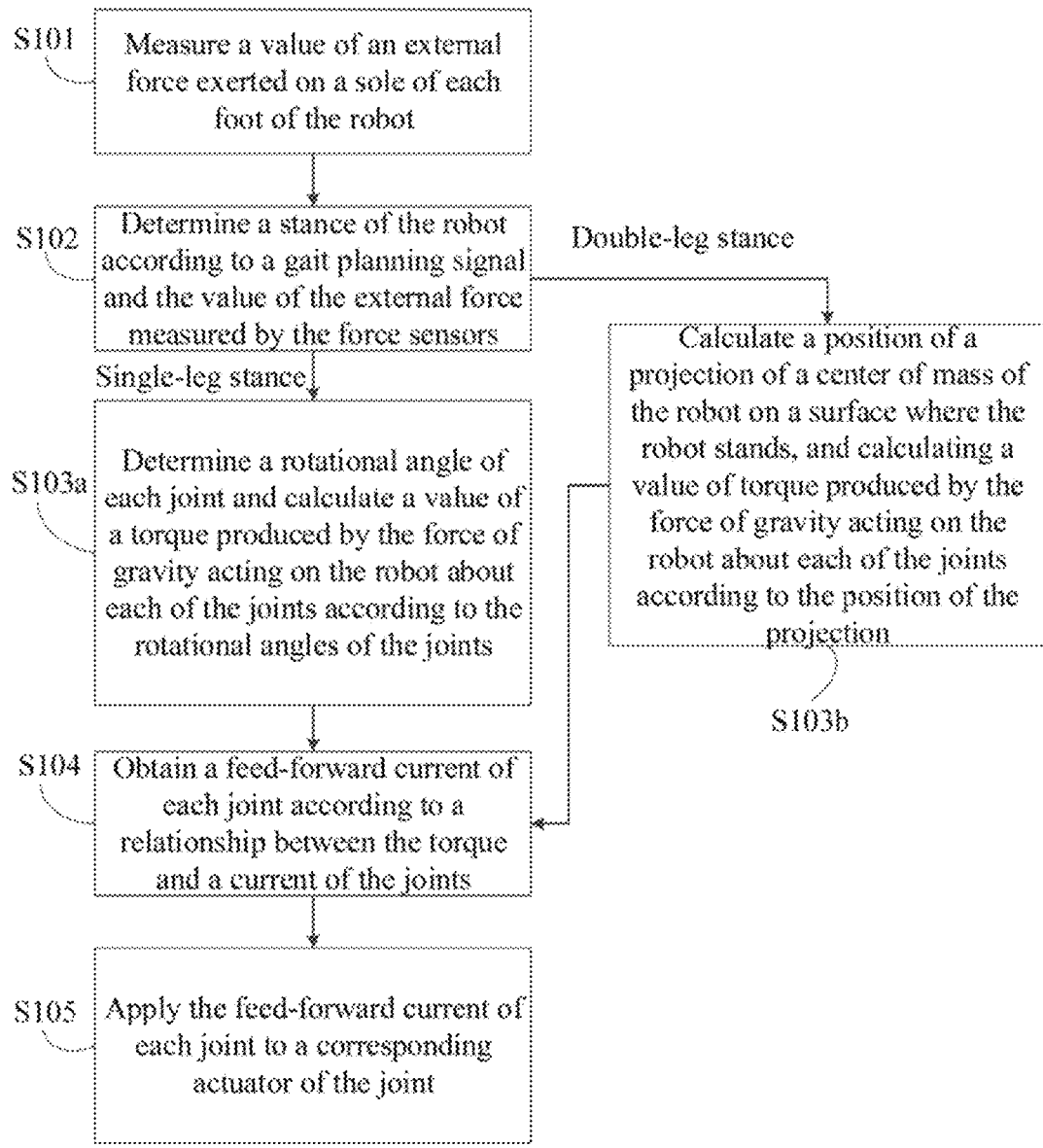
FIG. 2 is a flowchart of a method of controlling walking of the robot according to a first embodiment.
Figure 3:
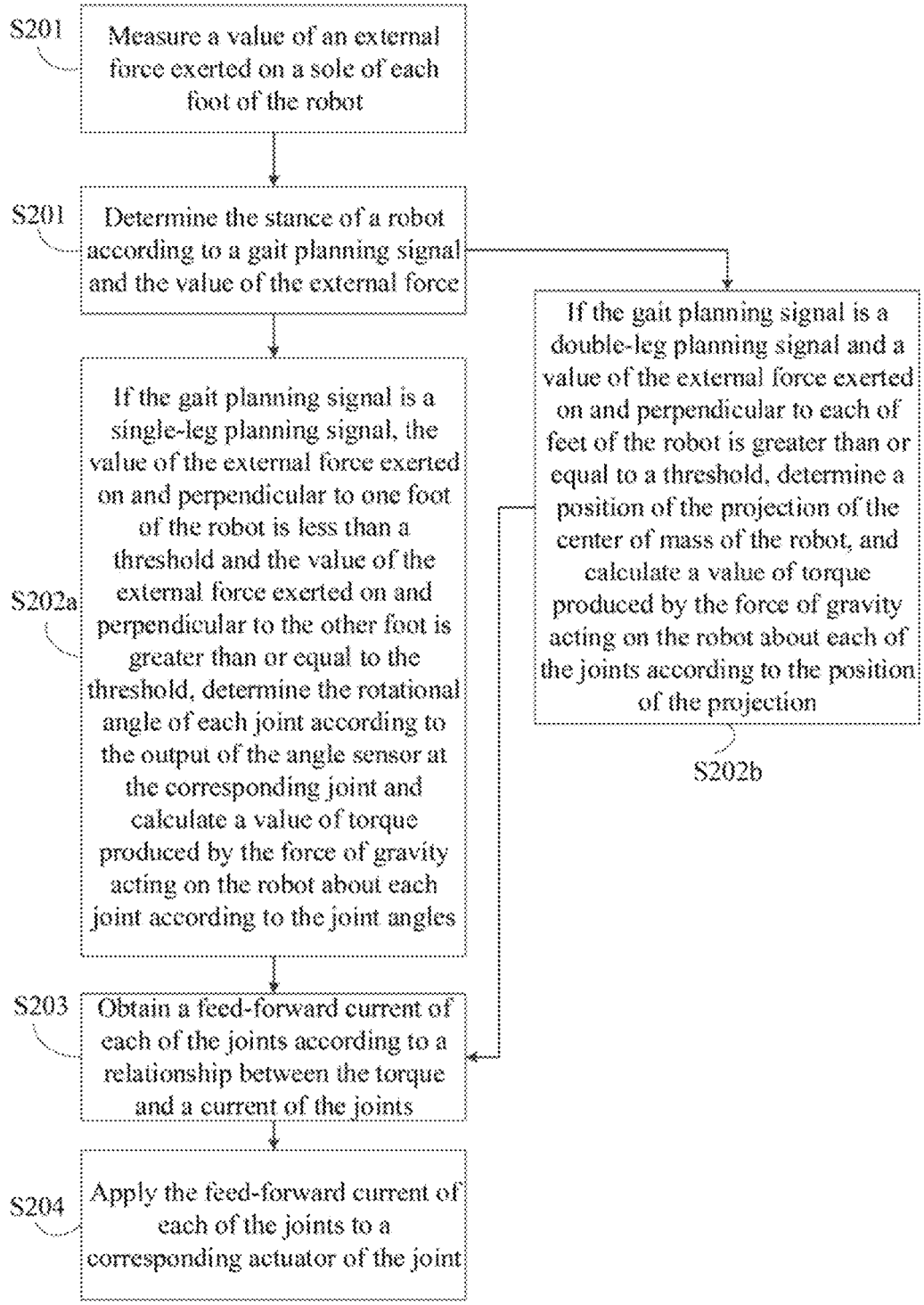
FIG. 3 is a flowchart of a method of controlling walking of the robot according to a second embodiment.
Figure 5:
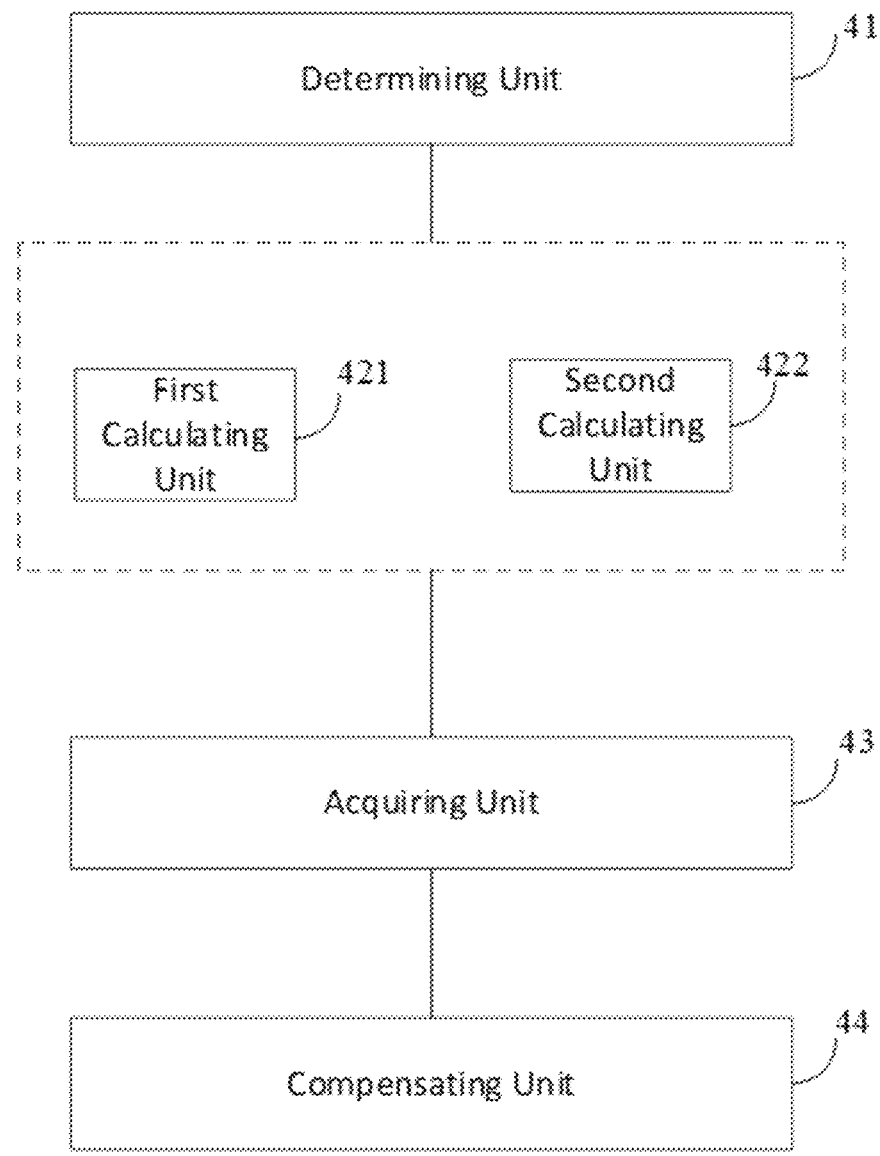
FIG. 5 is a schematic diagram of a device for controlling walking of the robot.

FIG. 1 is a schematic block diagram of a robot according to an embodiment. The robot 5 includes a processor 50, a storage 51, one or more computer programs 52 stored in the storage 51 and executable by the processor 50, a number of angle sensors 53, a number of force sensors 54, and a number of joints 55 that includes ankle joints, knee joints, and hip joints. When the processor 50 executes the computer programs 52, from Step S101 to S105 as shown in FIG. 2, or from Step S201 to S205 as shown in FIG. 3, and functions of modules/units such as the units 41 to 44 in FIG. 5 are implemented. The robot may be a bipedal robot having two feet with corresponding knees, legs, arms, elbows, neck, and a head, in one embodiment. The joints correspond to connections between one or more limbs of the body parts of the robot, such as, ankles, knees, elbows, neck, and shoulders for example.

The processor 50 may be a central processing unit (CPU), a general purpose processor, a digital signal processor (DSP), an application specific integrated circuit (ASIC), a field-programmable gate array (FPGA), a programmable logic device, a discrete gate, a transistor logic device, or a discrete hardware component. The general purpose processor may be a microprocessor or any conventional processor or the like.

The storage 51 may be an internal storage unit of the robot 5, such as a hard disk or a memory. The storage 51 may also be an external storage device of the robot 5, such as a plug-in hard disk, a smart memory card (SMC), and a secure digital (SD) card, or any suitable flash cards. Furthermore, the storage 51 may also include both an internal storage unit and an external storage device. The storage 51 is used to store computer programs, other programs, and data required by the robot. The storage 51 can also be used to temporarily store data that have been output or is about to be output.

The angle sensors 53 are arranged at or on an output shaft of a servo of a corresponding joint 55 and are electrically connected to the processor 50. When one or more of the joints 55 rotates (corresponding to an arm or leg moving in 2D or 3D space, for example), each of the angle sensors 53 provide an output to the processor 50 corresponding to a rotational angle of the joints 55.

The force sensors 54 are electrically connected to the processor 50. Each of the force sensors 54 measures an external force exerted on the sole of a corresponding foot and provides an output to the processor 50 about the external force. In the embodiment, the force sensors 54 are respectively arranged at the sole of the feet of the robot 5.

In the embodiment, the joints 55 include a number of rotary joints, each of which is used to rotatably connect two components together. Specifically, the joints 55 include three hip joints for providing rotation about three axes (yaw, roll and pitch) for the hip of each leg, a joint for providing a rotation for the knee of each leg, and two ankle joints for providing rotation about two axes (roll and pitch) for the foot of each leg.

It will be understood by those skilled in the art that FIG. 1 is merely an example of the robot 5, and does not limit the robot 5. The robot may include components different in numbers from those illustrated, or incorporate some other different components. For example, the robot may also include an input and output device, a network access device, a bus, and the like.

FIG. 2 is a flowchart of a method of controlling walking of the robot 5 including two feet and the joints 55. In one embodiment, the method includes the following steps:

Step S101: measuring a value of an external force exerted on a sole of each toot of the robot 5, wherein the value of the external force is determined according to output of a force sensor positioned at the sole of each foot and electrically connected to the robot.

Step S102: determining a stance of the robot according to a gait planning signal and the value of the external force measured by the force sensors 54, wherein the stance includes a single-leg stance and a double-leg stance. It should be understood that the single-leg stance means that the robot is upright and supported by a single leg and the double-leg stance means that the robot is upright and supported by two legs. In the embodiment, the gait planning signal is time series data defining a motion trajectory for each joint 55.

It should be noted that the walking of a robot is the result of a cyclic series of movements. As such, it can be conveniently characterized by a detailed description of its most fundamental unit: a gait cycle. In the embodiment, a gait cycle of a two-legged robot is measured from a foot-off moment of one foot to a foot-off moment of the other foot. Here, a foot-off moment refers to the moment when one foot starts to leave a surface (i.e., the ground) where the robot stands. The gait cycle usually includes a single-leg support phase and a double-leg support phase. The single-leg support phase of one gait cycle refers to a time period when the robot is upright and supported by a single leg, which is measured from the foot-off moment of the moving leg to the foot-strike moment of the moving leg. Here, a foot-strike moment refers to the movement when one foot starts to come into contact with the surface where the robot stands. The double-leg support phase of one gait cycle refers to a time period when the robot is upright and supported by two legs, which is measured from the foot-strike moment of one foot to the foot-off moment of the other foot. The gait cycle of the robot in the embodiment is set to be 1 second.

The gait planning signal is used to pre-plan walking routes of the robot according to characteristics of motions of a linear inverted pendulum system. In an actual walking process, the robot is controlled to walk by tracking movement along the above walking routes.

Optionally, whether the robot is currently in a single-leg stance or double-leg stance is determined by querying the gait planning signal. After this, a gait switching state for the next moment can be determined. The gait switching state refers to the robot switches from a single-leg support to a double-leg support or from a double-leg support to a single-leg support.

Optionally, six-dimensional torque sensors are used to detect forces exerted on the soles of the feet of the robot from the surface where the robot stands.

Step S103a: in response to the robot 5 being in a single-leg stance, determining a rotational angle of each joint 55 according to output of an angle sensor positioned at each joint 55 and electrically connected to the robot, and calculating a value of a torque produced by the force of gravity acting on the robot 5 about each of the joints 55 according to the rotational angles of the joints 55.

It should be noted that the position of the center of mass of each joint 55 is a function of the rotational angle of each joint 55. Thus, after the rotational angles of each joint 55 is determined in real-time based on the output of the angle sensors at the joint 55, the position of the center of mass of each joint 55 can be calculated according to a formula describing a relationship between the position of the center of mass of each joint 55.

In one embodiment, the rotational angles of each joint 55 are obtained by detecting an angular velocity or angular acceleration of each joint 55.

For humanoid robots, when the position of the center of mass of each joint 55 is determined, the value of the torque produced by the force of gravity acting on the robot about each of the joints 55 is also uniquely determined. The value of the torque is equal to a product of the force of gravity and a moment arm, and the moment arm is equal to an abscissa value of the center of mass in a relative coordinate system.

Optionally, the step of calculating the value of the torque produced by the farce of gravity acting on the robot 5 about each of the joints 55 according to the rotational angles includes calculating the value of the torque produced by the force of gravity acting on the robot about each of the joints 55 using a center-of-mass weighted sum formula, according to the rotational angles.

Step S103b: in response to the robot 5 being in a double-leg stance, calculating a position of a projection of a center of mass of the robot on a surface where the robot 5 stands, and calculating a value of torque produced by the force of gravity acting on the robot 5 about each of the joints 55 according to the position of the projection.

It should be noted that when the robot is in a single-leg stance, due to swings of a moving leg, the stability of the robot cannot be determined solely by the position of the projection of the center of mass. When the robot is in a double-leg stance, the value of the torque that each joint needs to compensate can be calculated according to the position of a projection of the robot's center of mass and the force acting on each leg of the robot which is determined according to the principle of leverage.

Step S104: obtaining a feed-forward current of each joint 55 according to a relationship between the torque and a current of the joints 55. Generally, servo motors operate in a closed-loop system, which includes a feedback device, a drive (amplifier), and a controller. The controller uses output from the feedback device to compare the commanded value (position, velocity, or torque) to the achieved value and issues commands to the drive to correct any errors. This process of monitoring feedback and making corrections is referred to as a control loop. In the embodiment, an actuator of a servo of each joint includes a position control loop, a velocity control loop and a current control loop. The current loop is typically nested inside the velocity loop, making current the innermost loop, with the velocity loop in the middle, and the position loop being the outermost loop. In the embodiment, feed-forward control is added. Specifically, the feed-forward current is a current fed to the current control loop. The primary goal of the current control loop is to control torque, which influences speed, and therefore, position.

Step S105: applying the feed-forward current of each joint 55 to a corresponding actuator of the joint 55.

Optionally, the above control is achieved by a current feedback mechanism. That is, calculating values of feed-forward currents corresponding to each joint 55 according to a relationship between the torque of joints 55 and the currents, and then applying the feed-forward currents to an actuator for a corresponding joint 55.

With the method above, each joint of the robot can be driven to reach the preset position quickly, which effectively reduces or even eliminates errors in trajectory tracking resulting from sudden changes of load, thereby improving the stability during walking.

FIG. 3 is a flowchart of another method of controlling walking of the robot, which includes the following steps:

Step S201: measuring a value of an external force exerted on a sole of each foot of the robot, wherein the value of the external force is determined according to output of a force sensor positioned at the sole of each foot and electrically connected to the robot.

Step S202: determining a stance of the robot according to a gait planning signal and the value of the external force, wherein the stance comprises a single-leg stance and a double-leg stance.

Step S202 is the same as Step S102 of the embodiment above and details with respect to the step will not be repeated here.

Step S203a: if the gait planning signal is a single-leg planning signal, a value of the external force that is exerted on and perpendicular to one foot of the robot is less than a threshold and a value of the external force that is exerted on and perpendicular to the other foot of the robot is greater than or equal to the threshold, determining by a processor a rotational angle of each joint 55 according to the output of the angle sensor at the corresponding joint 55 and calculating is value of torque produced by the force of gravity acting on the robot about each of the joints 55 according to the rotational angles.

Optionally, the center-of-mass weighted sum formula is represented as follows:

$$\tau_G^i = \sum_{j=i}^{n} M_j \cdot \vec{O}_i \cdot ((\vec{r}_j^{com} - \vec{r}_i^{joint}) \times \vec{g}),$$

i=1, 2, . . . , n, where $\tau_G^i$ represents the compensatory torque for an ith joint, $M_j$ represents the mass of the jth joint, $\vec{O}_i$ represents a vector coordinate of the center of mass of the ith joint in a relative coordinate system, which is used to generate the torque, $\vec{r}_j^{com}$ represents a vector coordinate of the center of mass of the jth joint in a relative coordinate system, $\vec{r}_j^{joint}$ represents a vector coordinate of the center of mass of the ith joint in an absolute coordinate system, and $\vec{q}$ represents a gravity acceleration vector.

Figure 4:
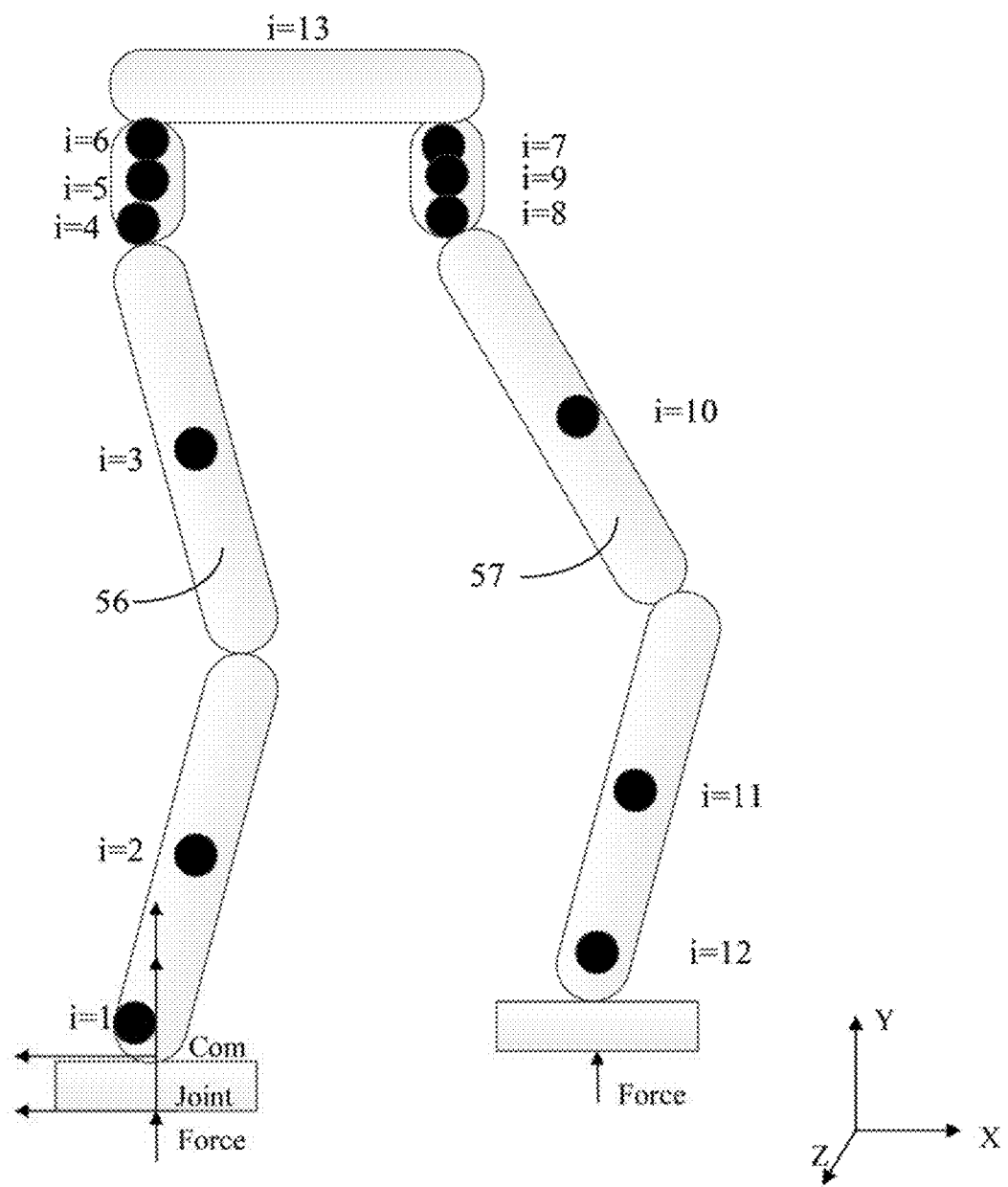
FIG. 4 is a schematic diagram showing a relative coordinate system and an absolute coordinate system established by taking a first joint of a robot controlled by a method of the second embodiment as an example.

In the embodiment, referring to FIG. 4, when the two-legged robot is in a single-leg stance, it can be equivalent to a 12-degree-of-freedom manipulator which is mainly consisted of two legs 56 and 57 of the robot. One leg (leg 56 in FIG. 4) is fixed to the ground and both legs 56 and 57 include, from bottom to top, two ankle joints, one knee joint, and three hip joints, all of which are single-degree-of-freedom joints. The degree of freedom of each leg is 6. For convenience of description, the center of mass of each joint is represented by a black solid circle. When a Cartesian relative coordinate system (denoted as Com) is established with a contact point between two joints as a coordinate origin, and a Cartesian absolute coordinate system (denoted as Joint) is established with a contact point of the leg of the support foot with the ground as the coordinate origin, based on the two coordinate systems above and the rotational angle of each joint, a vector coordinates of the center of mass of each joint in the relative coordinate system and the absolute coordinate system can be determined.

In one embodiment, taking the first joint of the left leg of FIG. 4 for an example, a calculation formula for calculating the value of the torque produced by the force of gravity acting on the first joint according to the center-of-mass weighted sum formula described above is as follows:

$$\tau_G^i = M_1[x_1^{com}, 0, 0] \cdot \left\{ \begin{bmatrix} x_1^{com} - x_1^{joint} \\ y_1^{com} - y_1^{joint} \\ z_1^{com} - z_1^{joint} \end{bmatrix} \times \begin{bmatrix} 0 \\ 0 \\ -g \end{bmatrix} \right\} +$$

-continued $$M_2[x_1^{com}, 0, 0] \cdot \left\{ \begin{bmatrix} x_2^{com} - x_1^{joint} \\ y_2^{com} - y_1^{joint} \\ z_2^{com} - z_1^{joint} \end{bmatrix} \times \begin{bmatrix} 0 \\ 0 \\ -g \end{bmatrix} \right\} + \ldots , +M_{12}[x_1^{com}, 0, 0] \cdot$$

$$\left\{ \begin{bmatrix} x_{12}^{com} - x_1^{joint} \\ y_{12}^{com} - y_1^{joint} \\ z_{12}^{com} - z_1^{joint} \end{bmatrix} \times \begin{bmatrix} 0 \\ 0 \\ -g \end{bmatrix} \right\}$$

where $x_j^{com}$ is the projection of the center of mass of the jth joint on the x axis in the relative coordinate system, $y_j^{com}$ is the projection of the center of mass of the jth joint on the y axis in the relative coordinate system, $z_j^{com}$ is the projection of the center of mass of the jth joint on the z axis in the relative coordinate system, $x_1^{joint}$ is the projection of the center of mass of the first joint on the x axis in the absolute coordinate system, $y_1^{joint}$ is the projection of the center of mass of the first joint on the y axis in the absolute coordinate system, and $z_1^{joint}$ is the projection of the center of mass of the first joint on the z axis in the absolute coordinate system.

Step S203b: if the gait planning signal is a double-leg planning signal and the value of the external force that is exerted on and perpendicular to each of feet of the robot is greater than or equal to a threshold, determining a position of the projection of the center of mass of the robot, and calculating a value of torque produced by the force of gravity acting on the robot about each of the joints 55 according to the position of the projection.

Specifically, the step of determining the position of the projection of the center of mass of the robot and calculating the value of the torque produced by the force of gravity acting on the robot about each of the joints 55 according to the position of the projection, includes:

According to the position of the projection of the center of mass of the robot, determining the force acting on each leg of the robot; determining the force acting on each joint 55 based on the force acting on each leg of the robot; and according to the force acting on each joint 55, calculating the value of the torque produced by the force of gravity acting on the robot about each of the joints 55 using a center-of-mass weighted sum formula.

Step S204: obtaining a feed-forward current of each of the joints 55 according to a relationship between the torque and a current of the joints 55.

In the embodiment, the relationship between the torque produced by the force of gravity acting on the robot about each of the joints 55 and current is a proportional function relationship when the influence of factors such as friction inside the motor is not considered.

In one embodiment, a proportional function describing a relationship between the torque produced by the force of gravity acting on the robot about each of the joints 55 and current is represented as: $\tau_G = k \cdot I$, where $\tau_G$ represents the torque produced by the force of gravity acting on the robot about each of the joints 55, k represents a constant, and I represents the feed-forward current.

Step S205: applying the feed-forward current of each of the joints 55 to a corresponding actuator of the joint 55.

The step S205 is the same as the step S105 of the embodiment above and details with respect to the step will not be repeated here.

The method of the embodiment above determines a stance of the robot by comparing a force that is exerted on and perpendicular to each of feet of the robot with a preset threshold, which improves accuracy of determining switching of stance of the robot at the next moment. Furthermore, when calculating the value of the torque produced by the force of gravity acting on the robot about each of the joints 55 according to the rotational angle, the compensation result can be more accurate because the gravity influence of the remaining joint 55 is considered. Furthermore, the feed-forward current value for each joint 55 can be quickly obtained according to the linear relationship between the torque produced by the force of gravity acting on the robot about each of the joints 55 and current. It can effectively reduce or even eliminate the errors in the trajectory tracking occurred due to the sudden change of load by applying a feed-forward current to an actuator, thereby improving the stability during walking.

FIG. 5 is a schematic diagram of a device for controlling walking of the robot. For convenience of description, only parts related to the embodiment of the present invention are shown. In the embodiment, the device is installed in a robot.

The device includes a determining unit 41, a first calculation unit 421, a second calculation unit 422, an acquiring unit 43 and a compensating unit 44. When the processor 50 executes the computer programs 52, the functions of the modules/units such as the units 41 to 44 are implemented.

The determining unit 41 is used to determine a stance of the robot according to a gait planning signal and a value of the force exerted on a sole of each foot of the robot.

The first calculation unit 421 is used to determine if the robot is in a single-leg stance, a rotational angle of each joint 55 of the robot according to output of angle sensors at the joints 55, and to calculate a value of torque produced by the force of gravity acting on the robot about each of the joints 55 according to the rotational angles.

The second calculation unit 422 is used to calculate, if the robot is in a double-leg stance, a position of a projection of a center of mass of the robot on a surface where the robot stands, and calculate a value of torque produced by the force of gravity acting on the robot about each of the joints 55 according to the position of the projection.

The acquiring unit 43 is used to obtain a feed-forward current of each of the joints 55 according to a relationship between the torque and a current of the joints 55.

The compensating unit 43 is used to apply the feed-forward current of each of the joints 55 to a corresponding actuator of the joint 55.

In one embodiment, the determining unit 41 includes a first determining unit and a second determining unit.

The first determining unit is used to determine that the robot is in a single-leg stance, if the gait planning signal is a single-leg planning signal, a value of a force that is exerted on and perpendicular to one foot of the robot is less than a threshold and a value of a value of a force that is exerted on and perpendicular to the other foot of the robot is greater than or equal to the threshold, wherein the values of the force exerted on the feet of the robot are calculated based on output of force sensors on soles of the feet.

The second determining unit is used to determine that the robot is in a double-leg stance, if the gait planning signal is a double-leg planning signal and a value of a force exerted on and perpendicular to each of feet of the robot is greater than or equal to a threshold, wherein the values of the force exerted on the feet of the robot are calculated based on outputs from force sensors on soles of the feet.

Each of the above-mentioned units may be implemented in forms of hardware (e.g., a circuit), software (e.g., a program), or a combination thereof (e.g., a circuit with a single chip microcomputer). Alternatively, a device may include one or more processors, a storage (e.g., a memory), and one or more computer programs stored in the storage and executed by the processor, where the one or more computer programs include the above-mentioned units. The device can be included as part of the robot as an internal component or be an external component to the robot as an external computing device, such as a mobile phone, a tablet, etc.

In one embodiment, the computer program 52 can be divided into one or more modules/units that are stored in the storage 51 and executable by the processor 50. The one or more modules/units may be a series of computer program instruction segments capable of performing a particular function, the instruction segments being used to describe the execution process of the computer program 52 in the robot 5. For example, the computer programs 52 can be divided into a determining unit, a first calculating unit, a second calculating unit, an acquiring unit, and a compensation unit, and functions of each unit are as follows:

The determining unit is used to determine a stance of the robot according to a gait planning signal and a value of the force exerted on a sole of each foot of the robot.

The first calculation unit is used to determine, if the robot is in a single-leg stance, a rotational angle of each joint of the robot according to output of angle sensors at the joints, and calculate a value of torque produced by the force of gravity acting on the robot about each of the joints according to the rotational angles.

The second calculation unit is used to calculate, if the robot is in a double-leg stance, a position of a projection of a center of mass of the robot on a surface where the robot stands, and calculate a value of torque produced by the force of gravity acting on the robot about each of the joints according to the position of the projection.

The acquiring unit is used to obtain a feed-forward current of each of the joints according to a relationship between the torque and a current of the joints;

The compensating unit is used to apply the feed-forward current of each of the joints to a corresponding actuator of the joint.

A person skilled in the art can clearly understand that for convenience and brevity of descriptions, he/she can refer to the process in the foregoing method embodiments for a specific working process of the system, the device and the units described above, and details are not described herein again.

In the embodiments above, the descriptions of the various embodiments have their respective focuses. For parts that are not detailed or described in a certain embodiment, related descriptions in other embodiments may be referred to.

A person skilled in the art will understand that the modules, units and/or method steps described in connection with the embodiments disclosed herein can be implemented by electronic hardware or a combination of computer software and electronic hardware. Whether these functions are performed in hardware or software depends on specific applications and design constraints of technical solutions. A professional technical person can use different methods for implementing the described functions for each particular application, but such implementation should not be considered to be beyond the scope of the present invention.

It should be understood that, according to the embodiments of the present disclosure, the disclosed system, apparatus and methods may be implemented in other ways. For example, the described apparatus embodiment is merely exemplary. The division of the units is merely based on logical functions, and the units may be divided with other approaches in practice. For example, multiple units or modules may be combined, or may be integrated into another system, or some features may be omitted or not be implemented. In addition, displayed or discussed couplings, direct couplings or communication connections between individual components may be implemented via indirect couplings or communication connections between some interfaces, devices or units, which may be electrical, mechanical or in other forms.

The units described as separate components may be or may not be separated physically. The components shown as units may be or may not be physical units, i.e., the units may be located at one place or may be distributed onto multiple network units. All of or part of the units may be selected based on actual needs to implement the solutions according to the embodiments of the disclosure.

In addition, individual function units according to the embodiments of the disclosure may be integrated in one processing unit, or the units may exist separately, or two or more units may be integrated in one unit. The foregoing integrated units may be realized in a form of hardware, or realized in a form of software functional units.

If the integrated unit is implemented in the form of software function unit and the software function unit is sold or used as separate products, the software function unit may also be stored in a computer readable storage medium. Based on such understanding, the technical solutions of the disclosure or the part of the disclosure that contributes to conventional technologies or part of the technical solutions may be embodied in the form of a software product. The computer software product is stored in a storage medium and includes several instructions for instructing a computer device (which may be a personal computer, a server, a network device or the like) or a processor to implement all of or part of the steps of the methods according to the embodiments of the disclosure. The foregoing storage medium includes various media that can store programs, for example, USB disks, mobile hard disk drives, read-only memories (ROMs), random access memories (RAMs), magnetic disks, optical disks and the like.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A computer-implemented method for controlling walking of a robot comprising a first foot, a second foot, and a plurality of joints, the method comprising:
    measuring a value of an external force exerted on a sole of the first foot and the second foot, wherein the value of the external force is determined according to output of a force sensor positioned at the sole of the first foot and the second foot and electrically connected to the robot;
    determining a stance of the robot according to a gait planning signal and the value of the external force, wherein the stance comprises a single-leg stance and a double-leg stance, and the gait planning signal is time series data defining a motion trajectory for each of the joints;
    in response to the robot being in the single-leg stance, determining a rotational angle of each of the joints according to output of an angle sensor positioned at each of the joints and electrically connected to the robot, and calculating a value of a torque produced by a force of gravity acting on the robot about each of the joints according to the rotational angles of the joints;
    in response to the robot being in the double-leg stance, calculating a position of a projection of a center of mass of the robot on a surface where the robot stands, and calculating a value of a torque produced by a force of gravity acting on the robot about each of the joints according to the position of the projection;
    obtaining a feed-forward current of each of the joints according to a relationship between the torque and a current of each of the joints; and
    applying the feed-forward current of each of the joints to a corresponding actuator of the joints, wherein an actuator of a servo of each of the joints comprises a position control loop, a velocity control loop and a current control loop, the current control loop is an innermost loop, the velocity control loop is a middle loop, the position control loop is an outermost loop, and the feed-forward current is a current fed to the current control loop.

2. The method according to claim 1, wherein the step of determining the stance of the robot comprises:
    determining the robot to be in the single-leg stance, in response to the gait planning signal being a single-leg planning signal, the value of the external force exerted on the first foot being less than a threshold, and the value of the external force exerted on the second foot of the robot being greater than or equal to the threshold; and
    determining the robot to be in the double-leg stance, in response to the gait planning signal being a double-leg planning signal and the value of the external force exerted on each of the first foot and the second foot of the robot being greater than or equal to the threshold.

3. The method according to claim 1, wherein the step of calculating the value of the torque, comprises:
    calculating the value of the torque produced by the force of gravity acting on the robot about each of the joints using a center-of-mass weighted sum formula, according to the rotational angles of the joints.

4. The method according to claim 3, wherein the center-of-mass weighted sum formula is as follows:

$$\tau_G^i = \sum_{j=i}^{n} M_j \cdot \vec{O}_i \cdot ((\vec{r}_j^{com} - \vec{r}_i^{joint}) \times \vec{g}),$$

i=1, 2, . . . , n, wherein $\tau_G^i$ represents a compensatory torque for an ith joint, $M_j$ represents a mass of a jth joint, $\vec{O}_i$ represents a vector coordinate of the center of mass of the ith joint in a relative coordinate system, which is used to generate the torque, $\vec{r}_j^{com}$ represents a vector coordinate of the center of mass of the jth joint in a relative coordinate system, $\vec{r}_i^{joint}$ represents a vector coordinate of the center of mass of the ith joint in an absolute coordinate system, and $\vec{g}$ represents a gravity acceleration vector.

5. The method according to claim 4, wherein when the robot is in the single-leg stance, the robot is equivalent to a 12-degree-of-freedom manipulator which is mainly consisted of two legs of the robot, one leg of the robot is fixed to the ground and both legs of the robot comprise from bottom to top, two ankle joints, one knee joint, and three hip joints, all of which are single-degree-of-freedom joints, and degree of freedom of each leg is 6.

6. The method according to claim 5, wherein a Cartesian relative coordinate system is established with a contact point between two joints as a coordinate origin, a Cartesian absolute coordinate system is established with a contact point of a leg of a support foot with the ground as the coordinate origin, and the vector coordinates of the center of mass of each of the joints in the Cartesian relative coordinate system and the Cartesian absolute coordinate system is determined based on the Cartesian relative coordinate system, the Cartesian absolute coordinate system and the rotational angle of each of the joints.

7. The method according to claim 1, wherein the step of calculating the position of the projection of the center of mass of the robot on a surface where the robot stands, and calculating the value of the torque produced by the force of gravity acting on the robot about each of the joints according to the position of the projection, comprises:
   determining a first force exerted on each of two legs of the robot according to the projection of the center of mass of the robot;
   determining a second force exerted on each of the joints according to the first force; and calculating the value of the torque produced by the force of gravity acting on the robot about each of the joints using a center-of-mass weighted sum formula, according to the second force.

8. The method according to claim 1, wherein the relationship between the torque and the current of each the joint is: $\tau_G = k \cdot I$, where $\tau_G$ represents the torque produced by the force of gravity acting on the robot about each of the joint, and k represents a factor and I represents the feed-forward current.

9. The method according to claim 1, wherein the joints comprise ankle joints, knee joints, and hip joints.

10. The method according to claim 1, wherein the gait planning signal is used to pre-plan walking routes of the robot according to characteristics of motions of a linear inverted pendulum system, and the robot is controlled to walk by tracking movement along the walking routes.

11. The method according to claim 1, wherein the force sensor is a six-dimensional torque sensor.

12. The method according to claim 1, wherein the relationship between the torque and the current of each of the joints is a proportional function relationship.

13. A robot, comprising:
   a first foot;
   a second foot;
   a plurality of joints;
   one or more processors;
   a storage; and
   one or more computer programs stored in the storage and executed by the one or more processors, cause the one or more processors to perform steps of:
   measuring a value of an external force exerted on a sole of the first foot and the second foot, wherein the value of the external force is determined according to output of a force sensor positioned at the sole of the first foot and the second foot and electrically connected to the robot;
   determining a stance of the robot according to a gait planning signal and the value of the external force, wherein the stance comprises a single-leg stance and a double-leg stance, and the gait planning signal is time series data defining a motion trajectory for each of the joints;
   in response to the robot being in the single-leg stance, determining a rotational angle of each of the joints according to output of an angle sensor positioned at each of the joints and electrically connected to the robot, and calculating a value of a torque produced by a force of gravity acting on the robot about each of the joints according to the rotational angles of the joints;
   in response to the robot being in the double-leg stance, calculating a position of a projection of a center of mass of the robot on a surface where the robot stands, and calculating a value of a torque produced by a force of gravity acting on the robot about each of the joints according to the position of the projection;
   obtaining a feed-forward current of each of the joints according to a relationship between the torque and a current of each of the joints; and
   applying the feed-forward current of each of the joints to a corresponding actuator of the joints, wherein an actuator of a servo of each of the joints comprises a position control loop, a velocity control loop and a current control loop, the current control loop is an innermost loop, the velocity control loop is a middle loop, the position control loop is an outermost loop, and the feed-forward current is a current fed to the current control loop.

14. The robot according to claim 13, wherein the step of determining the stance of the robot comprises:
   determining the robot to be in the single-leg stance, in response to the gait planning signal being a single-leg planning signal, the value of the external force exerted on the first foot being less than a threshold, and the value of the external force exerted on the second foot of the robot being greater than or equal to the threshold; and
   determining the robot to be in the double-leg stance, in response to the gait planning signal being a double-leg planning signal and the value of the external force exerted on each of the first foot and the second foot of the robot being greater than or equal to the threshold.

15. The robot according to claim 13, wherein the step of calculating the value of the torque comprises:
   calculating the value of the torque produced by the force of gravity acting on the robot about each of the joints using a center-of-mass weighted sum formula, according to the rotational angles of the joints.

16. The robot according to claim 15, wherein the center-of-mass weighted sum formula is as follows:

$$\tau_G^i = \sum_{j=i}^{n} M_j \cdot \vec{O}_i \cdot \left( (\vec{r}_j^{com} - \vec{r}_i^{joint}) \times \vec{g} \right),$$

i=1, 2, ..., n, wherein $\tau_G^i$ represents a compensatory torque for an ith joint, $M_j$ represents a mass of a jth joint, $\vec{O}_i$ represents a vector coordinate of the center of mass of the ith joint in a relative coordinate system, which is used to generate the torque, $\vec{r}_j^{com}$ represents a vector coordinate of the center of mass of the jth joint in a relative coordinate system, $\vec{r}_i^{joint}$ represents a vector coordinate of the center of mass of the ith joint in an absolute coordinate system, and $\vec{g}$ represents a gravity acceleration vector.

17. The robot according to claim 13, wherein the step of calculating the position of the projection of the center of mass of the robot on the surface where the robot stands, and calculating the value of the torque produced by the force of gravity acting on the robot about each of the joints according to the position of the projection, comprises:
  determining a first force exerted on each of two legs of the robot according to the projection of the center of mass of the robot;
  determining a second force exerted on each of the joints according to the first force; and
  calculating the value of the torque produced by the force of gravity acting on the robot about each of the joints using a center-of-mass weighted sum formula, according to the second force.

18. The robot according to claim 13, wherein the relationship between the torque and the current of each the joint is: $\tau_G = k \cdot I$, where $\tau_G$ represents the torque produced by the force of gravity acting on the robot about each of the joint, and k represents a factor and I represents the feed-forward current.

19. The robot according to claim 13, wherein the joints comprise ankle joints, knee joints and hip joints.

* * * * *